United States Patent
Da Costa et al.

(10) Patent No.: US 9,631,495 B2
(45) Date of Patent: Apr. 25, 2017

(54) COOLING FOR THE RETAINING DOVETAIL OF A TURBOMACHINE BLADE

(71) Applicant: SNECMA, Paris (FR)

(72) Inventors: Emmanuel Da Costa, Moissy-Cramayel (FR); Alain Dominique Gendraud, Moissy-Cramayel (FR); Renaud Martet, Moissy-Cramayel (FR); Josselin Sicard, Moissy-Cramayel (FR); Bruno Andre Jean Varin, Moissy-Cramayel (FR)

(73) Assignee: SNECMA, Paris (FR)

( * ) Notice: Subject to any disclaimer, the term of this patent is extended or adjusted under 35 U.S.C. 154(b) by 498 days.

(21) Appl. No.: 14/349,484

(22) PCT Filed: Oct. 10, 2012

(86) PCT No.: PCT/FR2012/052304
§ 371 (c)(1),
(2) Date: Apr. 3, 2014

(87) PCT Pub. No.: WO2013/054043
PCT Pub. Date: Apr. 18, 2013

(65) Prior Publication Data
US 2014/0294597 A1    Oct. 2, 2014

(30) Foreign Application Priority Data

Oct. 10, 2011 (FR) ...................... 11 59131

(51) Int. Cl.
*F03D 1/06* (2006.01)
*F01D 5/08* (2006.01)

(52) U.S. Cl.
CPC ............. *F01D 5/081* (2013.01); *Y02T 50/673* (2013.01); *Y02T 50/676* (2013.01)

(58) Field of Classification Search
CPC .......... F01D 5/081; F01D 5/082; F01D 5/085; F01D 5/3007; F01D 5/323; Y02T 50/673; Y02T 50/676

(Continued)

(56) References Cited

U.S. PATENT DOCUMENTS

| 1,050,187 | A | * | 1/1913 | Westinghouse | ......... F01D 5/323 |
| | | | | | 416/218 |
| 3,266,771 | A | * | 8/1966 | Morley | ..................... F01D 5/22 |
| | | | | | 416/190 |

(Continued)

FOREIGN PATENT DOCUMENTS

| EP | 0 859 127 | 8/1998 |
| GB | 2 409 240 | 6/2005 |
| GB | 2 411 697 | 9/2005 |

OTHER PUBLICATIONS

International Search Report issued Nov. 27, 2012, in PCT/FR12/052304 filed Oct. 10, 2012.

*Primary Examiner* — Craig J Price
(74) *Attorney, Agent, or Firm* — Oblon, McClelland, Maier & Neustadt, L.L.P.

(57) ABSTRACT

A turbomachine assembly in which a foil is configured to cover mainly one of bulbs of a disc and to be held, radially with respect to the disc, by the bulb of the disc and a pocket for a blade that can collaborate therewith, when these two are effectively collaborating, and the bulb of the disc includes at least one longitudinal cavity configured to form, with the foil, when the foil is covering the bulb of the disc, a secondary passage through which a secondary cooling air flow can pass.

7 Claims, 6 Drawing Sheets

(58) Field of Classification Search
USPC .............. 416/96 R, 217, 219 R, 220 R, 248
See application file for complete search history.

(56) References Cited

U.S. PATENT DOCUMENTS

| | | | | |
|---|---|---|---|---|
| 3,897,168 A * | 7/1975 | Amos | .................. | F04D 27/023 415/115 |
| 4,040,770 A * | 8/1977 | Carlson | .................. | C22C 47/00 244/131 |
| 4,457,668 A * | 7/1984 | Hallinger | .................. | F01D 5/26 416/190 |
| 5,074,754 A * | 12/1991 | Violette | ................ | F01D 5/3038 403/381 |
| 5,160,243 A * | 11/1992 | Herzner | .................... | F01D 5/28 416/220 R |
| 5,173,024 A * | 12/1992 | Mouchel | .................. | F01D 5/066 416/220 R |
| 5,211,407 A * | 5/1993 | Glynn | .................... | F01D 11/006 277/632 |
| 5,240,375 A * | 8/1993 | Wayte | ........................ | F01D 5/28 416/219 R |
| 5,302,086 A * | 4/1994 | Kulesa | .................. | F01D 5/3007 416/220 R |
| 5,511,945 A * | 4/1996 | Glezer | .................... | F01D 5/081 416/219 R |
| 5,573,377 A | 11/1996 | Bond et al. | | |
| 5,957,660 A * | 9/1999 | Evans | .................. | F01D 5/081 415/115 |
| 6,017,189 A * | 1/2000 | Judet | ........................ | F01D 5/081 416/193 A |
| 6,065,938 A * | 5/2000 | Bartsch | ...................... | F01D 5/30 416/219 R |
| 6,183,202 B1 * | 2/2001 | Ganshaw | .............. | F01D 5/3007 416/219 R |
| 6,457,935 B1 * | 10/2002 | Antunes | ................ | F01D 11/008 415/115 |
| 6,494,684 B1 * | 12/2002 | Wagner | .................. | F01D 5/3015 403/278 |
| 7,513,747 B2 * | 4/2009 | Bachofner | ............ | F01D 5/3038 416/215 |
| 7,862,296 B2 * | 1/2011 | Finneran | ................. | F01D 9/042 415/209.3 |
| 8,113,784 B2 * | 2/2012 | Gupta | ........................ | F01D 5/14 415/115 |
| 8,348,619 B2 * | 1/2013 | Derclaye | .............. | F01D 5/3038 416/193 A |
| 8,529,209 B2 * | 9/2013 | Belmonte | ............. | F01D 5/3092 416/221 |
| 8,535,011 B2 * | 9/2013 | Mace | ................... | F01D 5/3007 416/204 A |
| 8,870,545 B2 * | 10/2014 | Reghezza | ............. | F01D 5/3007 416/220 R |
| 9,033,666 B2 * | 5/2015 | Bosco | ..................... | F01D 5/081 416/96 R |
| 9,103,220 B2 * | 8/2015 | Garin | ...................... | F01D 5/081 |
| 9,157,330 B2 * | 10/2015 | Garin | ..................... | F01D 5/3084 |
| 9,181,805 B2 * | 11/2015 | Coutandin | ............. | F01D 5/081 |
| 2003/0017050 A1 * | 1/2003 | Simeone | ................ | F01D 5/066 416/96 R |
| 2003/0194318 A1 * | 10/2003 | Duesler | ................... | F01D 5/326 416/2 |
| 2004/0151590 A1 * | 8/2004 | Forrester | .............. | F01D 5/3092 416/219 R |
| 2005/0196278 A1 * | 9/2005 | Boswell | ................... | F01D 5/084 416/97 R |
| 2005/0232751 A1 | 10/2005 | Townes et al. | | |
| 2006/0024167 A1 * | 2/2006 | Chatel | .................... | F01D 5/3038 416/220 R |
| 2008/0232972 A1 * | 9/2008 | Bouchard | ............ | F01D 5/3007 416/235 |
| 2009/0004017 A1 * | 1/2009 | Belmonte | ............ | F01D 5/3092 416/219 R |
| 2009/0016890 A1 * | 1/2009 | Douguet | ............... | F01D 5/3007 416/219 R |
| 2009/0060745 A1 * | 3/2009 | Douguet | ............... | F01D 5/3007 416/219 R |
| 2009/0081046 A1 * | 3/2009 | Mace | ................... | F01D 5/3007 416/219 R |
| 2010/0166557 A1 * | 7/2010 | Howes | ................. | F01D 5/3007 416/183 |
| 2012/0308391 A1 * | 12/2012 | Garin | .................... | F01D 5/3084 416/219 R |
| 2012/0321461 A1 * | 12/2012 | Coutandin | ............. | F01D 5/081 416/1 |
| 2013/0034445 A1 * | 2/2013 | Ram | ...................... | F01D 5/187 416/219 R |
| 2013/0343894 A1 * | 12/2013 | Roussely-Rousseau | .. | F01D 5/10 416/204 R |
| 2015/0292336 A1 * | 10/2015 | Hui | ........................ | B23P 15/04 416/219 R |
| 2015/0322796 A1 * | 11/2015 | Roussely-Rousseau | | F01D 5/082 415/180 |
| 2015/0330246 A1 * | 11/2015 | Whitehead | ........... | F01D 5/3007 416/2 |
| 2016/0017727 A1 * | 1/2016 | Whitehurst | .......... | F01D 5/3007 416/219 A |
| 2016/0040541 A1 * | 2/2016 | Cosby | .................... | F01D 5/141 416/219 R |

* cited by examiner

COOLING FOR THE RETAINING DOVETAIL OF A TURBOMACHINE BLADE

BACKGROUND OF THE INVENTION

Field of the Invention

The present invention relates to the field of turbojet engines.

Description of the Related Art

A multi-flow (for example, dual flow) turbojet engine, for propelling transport aeroplanes, generally comprises an upstream fan delivering an annular air flow, this flow comprising a primary, central, annular portion that supplies the engine driving the fan, together with a secondary, outer, annular portion, intended to be exhausted into the atmosphere while providing a considerable fraction of the thrust.

In order to compress this annular air flow, the turbojet engine is fitted with a set of wheels provided with blades of large dimensions, which are fixed to discs by means of bulbs and recesses with which each of the discs and blades is provided, the bulbs of the disc having a complementary shape to that of the recesses of the blade and being capable of cooperating therewith, the recesses of the disc having a complementary shape to that of the bulbs of the blade capable of cooperating therewith.

Because the use of the turbojet engine is limited by temperature, the end of the disc, which constitutes the part of the disc nearest to the flow path, must be cooled.

Currently, this cooling is produced by a cooling air flow passing into the bottom of the recesses of the disc. To this end, each bulb of the blade is arranged relative to one of the recesses of the disc so as to contrive between them, when said bulb cooperates with said recess, a main channel through which the cooling air flow can pass, a foil also being positioned between said disc and said blade. This air flow, having crossed the main channel, and thus having cooled its boundary area, can then be exhausted into the annular air flow.

In this configuration, the cooling air flow mainly allows the recess and the bottom of the bulb of the disc to be cooled, to the detriment of the apex of the bulb. However, the apex of the bulb constitutes the most thermally stressed zone of the disc and therefore requires the most cooling. Consequently, cooling of the disc is not currently effective.

BRIEF SUMMARY OF THE INVENTION

The subject-matter of the present invention is to improve the effectiveness of cooling of the disc of a turbojet engine as defined above.

To this end, according to the invention, the turbine engine assembly, comprising a disc and a blade each having a set of bulbs and recesses, the bulbs of the disc being capable of cooperating with the recesses of the blade, the recesses of the disc being capable of cooperating with the bulbs of the blade, at least one of said bulbs of the blade being arranged relative to one of said recesses of the disc so as to contrive between them, when the bulb cooperates with said recess, a main channel through which a cooling air flow can pass, the assembly further comprising a foil capable of being positioned at least partly between said disc and said blade, is remarkable in that:

said foil is capable of covering mainly one of said bulbs of the disc and of being held, radially relative to said disc, by said bulb of the disc and the recess of the blade capable of cooperating therewith, when they are actually cooperating; and said bulb of the disc has at least one longitudinal cavity capable of forming, together with said foil, when the foil is covering said bulb of the disc, a secondary channel through which said cooling air flow can pass.

In this way, thanks to the present invention, the cooling air flow is routed directly to the apex of each bulb of the disc, which allows this particularly sensitive zone of the disc to be cooled more effectively, and therefore means that less of the air flow needed for propelling the aeroplane has to be taken off, hence improving the overall performance of the turbojet engine.

Where the bulb of the disc intended to be covered by the foil is positioned between two recesses of said disc, the foil advantageously has, on one side, a long end intended to cover at least partly one of said recesses and, on the other side, a short end. This asymmetry of the foil has the advantage of making it easier to fit.

Another advantage of this asymmetry is that the long end of the foil can be extended by means for axially locking said foil with respect to the recess covered by said long end.

In an advantageous embodiment, the bulb of the disc has at least two longitudinal cavities separated by an apex of said bulb, these being capable, when the foil is covering said bulb, of forming two secondary channels through which the cooling air flow can pass. In this way, retaining an apex of the bulb of the disc, which separates two secondary channels, makes it possible to ensure that the blade does not tilt over the apex of the bulb of the disc, which has the advantage of preventing any damage to the foil.

In order to route the cooling air flow into the secondary channels, delimited by the foil and the bulbs of the disc, the turbine engine assembly according to the invention can further comprise a sealing lock ring joining the disc and the blade upstream of them in terms of the direction in which the main and secondary cooling air flows pass, said sealing lock ring having a set of radial cavities via which said secondary cooling air flow can be routed into the secondary channel.

To channel the cooling air flow upstream and route it in front of the secondary channels, the sealing lock ring also has a set of radial grooves through which the blades pass when said sealing lock ring joins the disc and the blade. This creates a passage for the secondary cooling air flow.

Advantageously, the radial cavities of the sealing lock ring are arranged so that said radial cavities are positioned facing the bulbs of the disc when the sealing lock ring joins the disc and the blade. Moreover, to ensure that each radial cavity is correctly positioned facing each bulb of the disc, the turbine engine assembly according to the invention further comprises a movable ring having a set of radial projections capable of being housed in the radial grooves of the sealing lock ring, to prevent any rotation of said sealing lock ring.

In a first embodiment, the movable ring is arranged so as to cause the axial stopping of the blades upstream, in terms of the direction in which the main and secondary cooling air flows pass.

In a second embodiment, the sealing lock ring and the movable ring have respectively the same number of radial grooves and radial projections as the number of blade bulbs intended to cooperate with the disc, and the movable ring is arranged so as to cause the axial stopping of the blades upstream, in terms of the direction in which the main and secondary cooling air flows pass.

The invention also relates to a foil for an assembly according to one of the embodiments described above, said foil being capable of being positioned at least partly between the disc and the blade, this foil being remarkable:

in that it is capable of covering mainly one of the bulbs of the disc and of being held, radially relative to the disc, by said bulb of the disc and the recess of the blade capable of cooperating therewith, when they are actually cooperating; and in that, when it covers said bulb of the disc, it forms, together with at least one longitudinal cavity of said bulb of the disc, a secondary channel through which the secondary cooling air flow can pass.

The invention also relates to a turbine engine comprising at least one assembly according to one of the embodiments described above.

BRIEF DESCRIPTION OF THE SEVERAL VIEWS OF THE DRAWINGS

The figures in the appended drawing will make it easier to understand how the invention can be implemented. In these figures, identical reference signs denote similar technical elements.

DETAILED DESCRIPTION OF THE INVENTION

Figure 1:
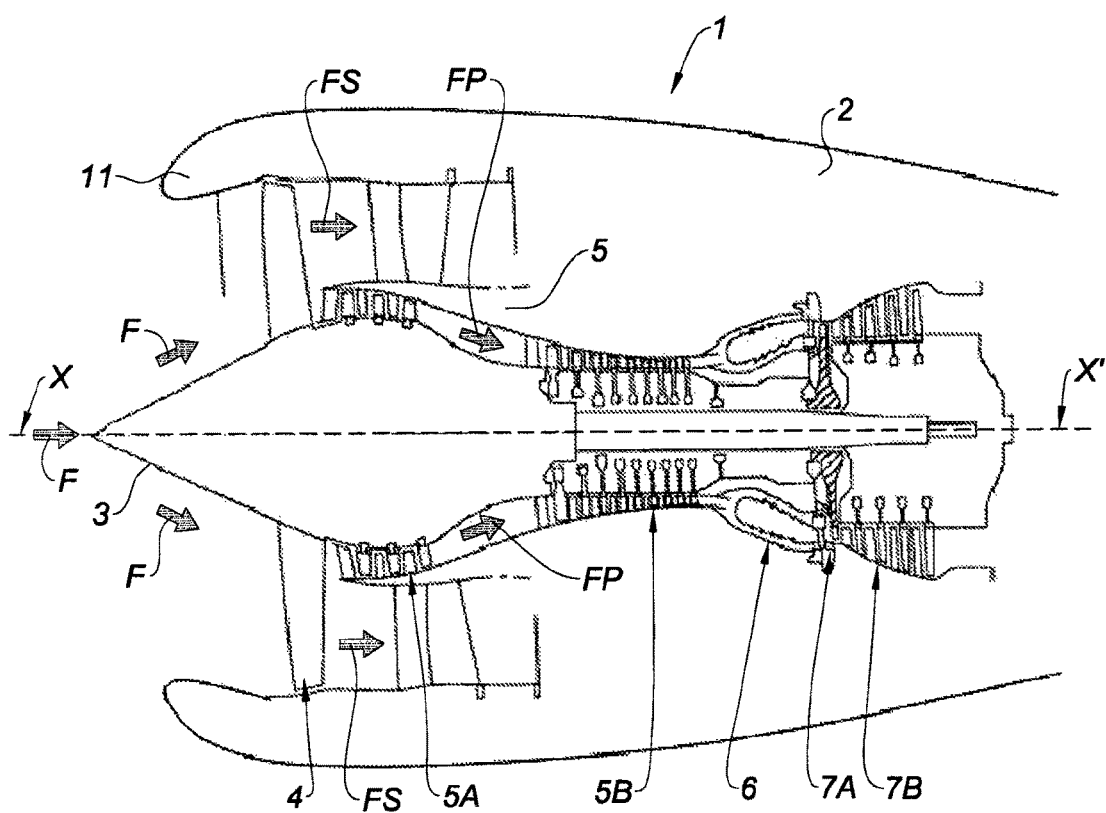
FIG. 1 is a diagram, in a cross-sectional plane, of a turbine engine according to the invention.

The turbine engine 1 in FIG. 1 is of the dual-flow, two-spool type, having rotational symmetry about an axis X-X'. In a known manner, this turbine engine 1 comprises, within a nacelle 2 serving as an envelope for its various members, an air inlet through which an incoming air flow F can penetrate and then pass through an inlet fan 4, positioned around an air inlet cone 3 that allows the total flow F to be guided aerodynamically and distributed about the axis X-X'. This air flow F is then separated into two flows, primary FP and secondary FS respectively, via an intermediate casing 5, the end of which forms a separating slat.

In the rest of the description, the terms "upstream" and "downstream" relate to axial positions along the longitudinal axis X-X' in the direction of flow of the air flow within the turbojet engine 1.

The secondary flow FS passes through a straightening stage and is then exhausted downstream of the turbine engine. The primary flow FP passes successively through a low-pressure compression stage 5A, a high-pressure compression stage 5B, a combustion chamber 6, a high-pressure turbine stage 7A and a low-pressure turbine stage 7B, finally being exhausted out of the turbine engine through a pipe (not given a reference sign).

The nacelle 2 of this turbojet engine is annular and positioned at least approximately coaxially about the longitudinal axis X-X'. This allows the gas flows generated by the turbine engine to be channelled while defining inner and outer aerodynamic flow lines for the gas flows.

Figure 2:
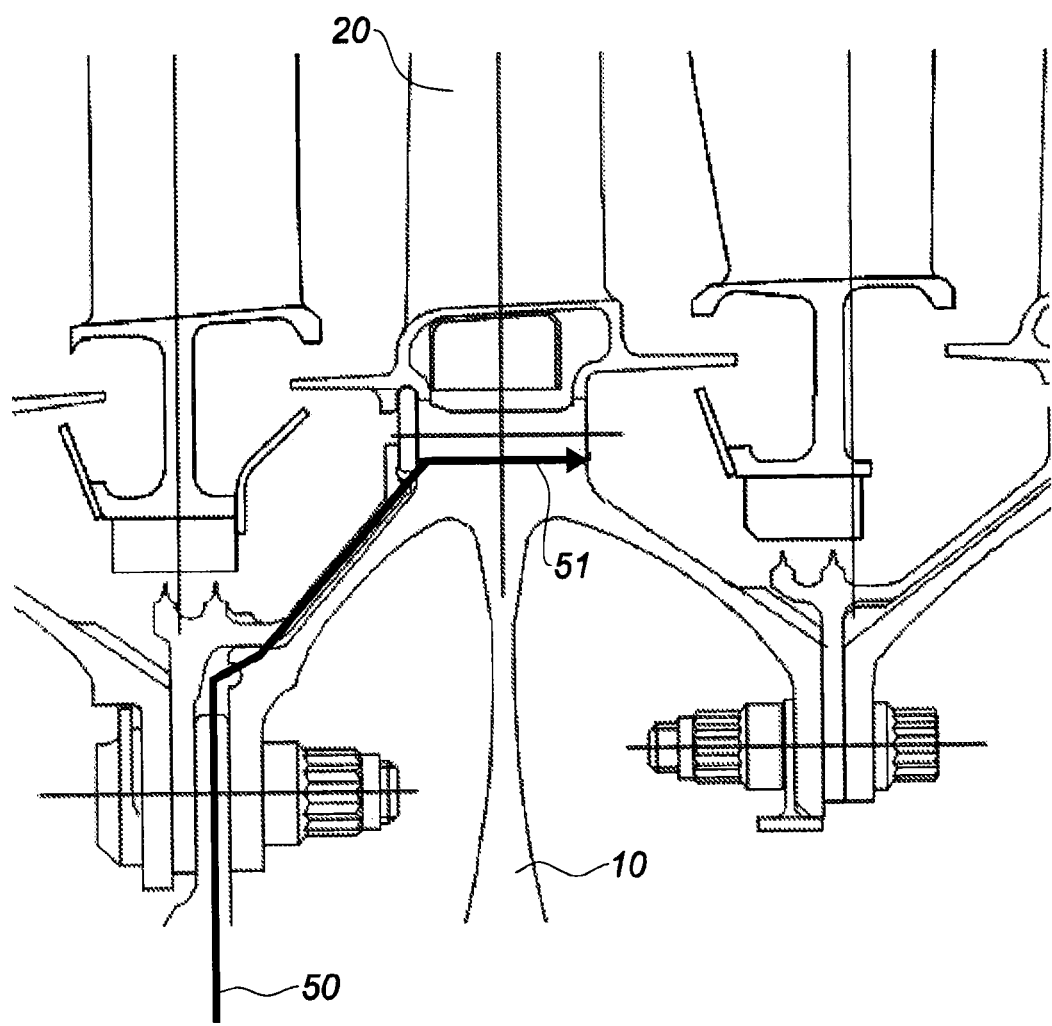
FIG. 2 is a diagram, in a cross-sectional plane, of a turbine engine assembly according to the invention, in which the disc and one blade are shown in part, in the area where they join.
Figure 3:
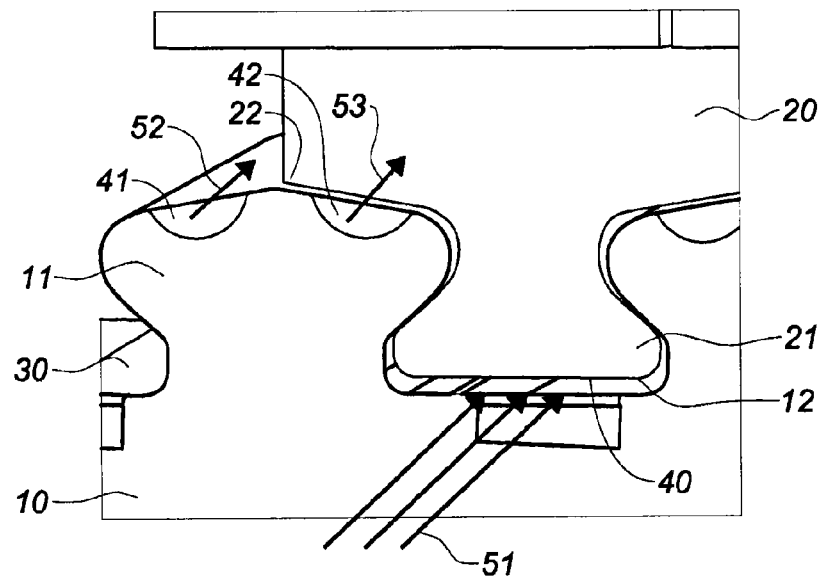
FIG. 3 is a perspective view of the apexes of the disc and one blade, separated by a foil, when they are cooperating.

As shown in FIG. 2, one of the discs 10 of the turbine engine 1 in FIG. 1, capable of rotating about the axis X-X' of said turbine engine, has a set of connections by means of which a plurality of blades, including the blade 20, are fixed thereto. To cool the head of the disc 10, which constitutes the area closest to the main flow path, a portion 50 of the primary air flow FP is taken off, such that at least part thereof, denoted by the reference sign 51 in FIG. 2 and referred to below as main cooling air flow, passes through the connections between the disc 10 and the blades 20.

The connections between the disc 10 and the blades 20 are produced by a set of bulbs and recesses, with which each of them is provided. The disc 10 thus has, at its end, a set of bulbs 11 and recesses 12, while the blade 20 has, at its end intended to cooperate with the disc 10, a set of bulbs 21 and recesses 22. The shape and dimensions of the bulbs 11 of the disc 10 are determined in such a way that they are capable of cooperating with the recesses 22 of the blade 20. In the same way, the bulbs 21 of the blade 20 are determined in such a way that they are capable of cooperating with the recesses 12 of the disc 10. Thus the blades 20 can easily be connected to the disc 10.

Figure 5:
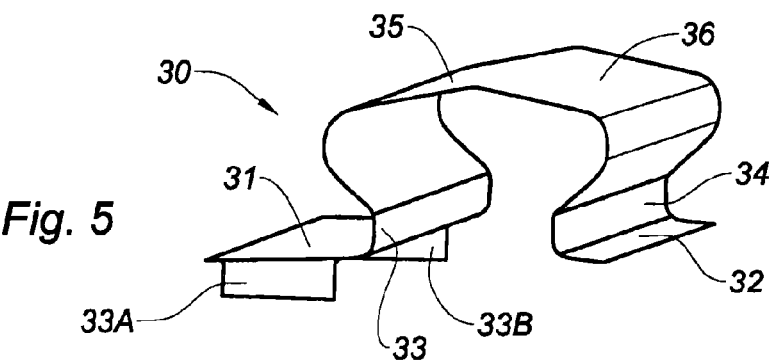
FIG. 5 is a perspective view of the foil in FIG. 3.

A foil 30, which will be described in greater detail below with reference to FIG. 5, is also positioned between the disc 10 and a blade 20.

The passage of the main cooling air flow 51 close to the end of the disc 10, for cooling said disc, is ensured when the disc 10 and the blade 20 are cooperating and when the foil 30 is positioned between said disc and said blade, by contriving a main channel 40 delimited on the one hand by the foil 30 and on the other hand by the bulb 21 of the blade 20. In this way the recess 12 of the disc 10 can be cooled by the passage of the air flow 51.

Figure 4:
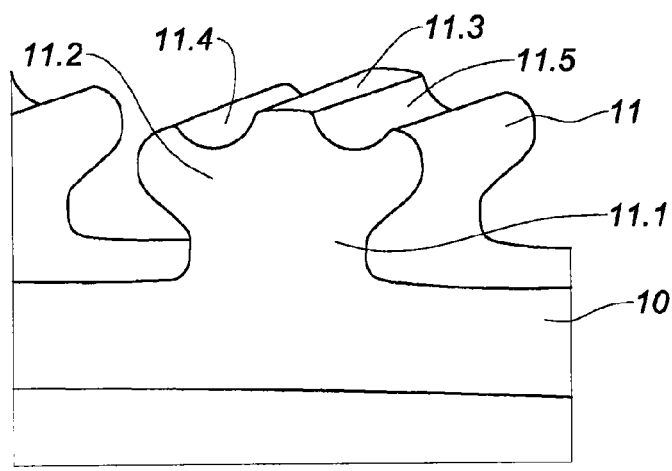
FIG. 4 is a perspective view of the apex of the disc in FIG. 3.

In accordance with the present invention, the bulb 11 of the disc 10, shown in isolation in FIG. 4 and having a lower portion 11.1 with a narrower cross-section and an upper portion 11.2 with a wider cross-section, has two longitudinal cavities 11.4 and 11.5, separated by an apex 11.3, in the area of the upper portion 11.2.

Furthermore, the foil 30, shown in isolation in FIG. 5, has a shape similar to that of the bulbs 11 and recesses 12 of the disc 10. In particular, the foil 30 comprises two upper portions 35 and 36, capable of covering the longitudinal cavities 11.4 and 11.5 of the disc 10, together with two side portions 33 and 34 intended to cover the side walls of the bulb 11. Given the (narrow and wide) cross-sections of the bulb 11, the foil 30 is flexible, so that it can be inserted into the bulb 11. Moreover, the foil 30 has a first, long end 31, in the extension of the side portion 33, and a second end 32, shorter than the end 31, in the extension of the side portion 34.

The foil 30, which is thin, is thus capable of covering mainly the bulb 11 and of being held, radially relative to the disc 10, by said bulb 11 and the recess 22, when they are actually cooperating.

Figure 6:
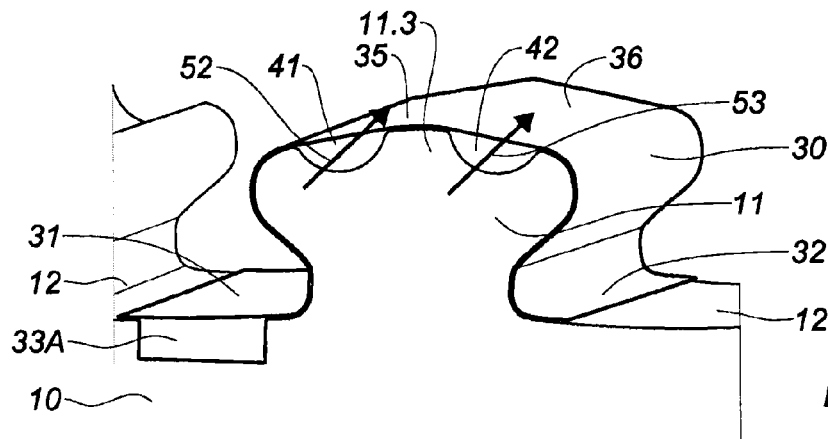
FIG. 6 is a perspective view of the apex of the disc in FIG. 3, when it is covered by the foil.

When the foil 30 is positioned over the bulb 11 (FIG. 6), the upper portions 35 and 36 respectively delimit, together with the longitudinal cavities 11.4 and 11.5, two secondary channels 41 and 42 through which two secondary cooling air flows 52 and 53 can pass, for cooling the zone of the disc 10 that is most subject to thermal stresses, namely the apex of the bulb 11.

It will be noted that, with the aim of axially locking the foil 30 with respect to the recess 12 covered by said long end 31, the long end 31 of the foil 30 is extended by axial locking means 33A, 33B, positioned on either side of the end 31 so as to bear against the walls of the disc 10 when the foil 30 is inserted into the bulb 11.

Figure 7:
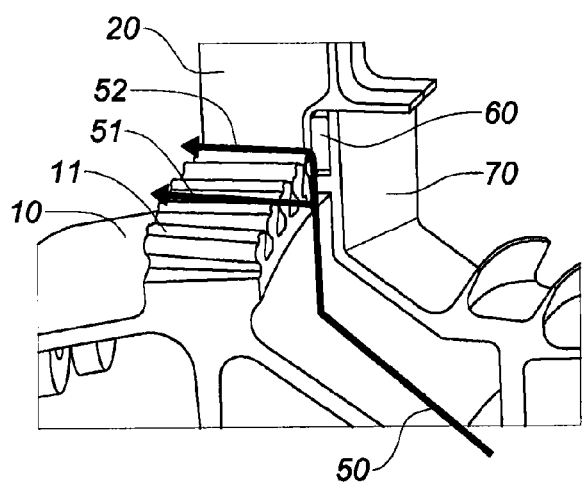
FIG. 7 is a perspective view of the turbine engine assembly according to the invention, also comprising a sealing lock ring and a movable ring.
Figure 8:
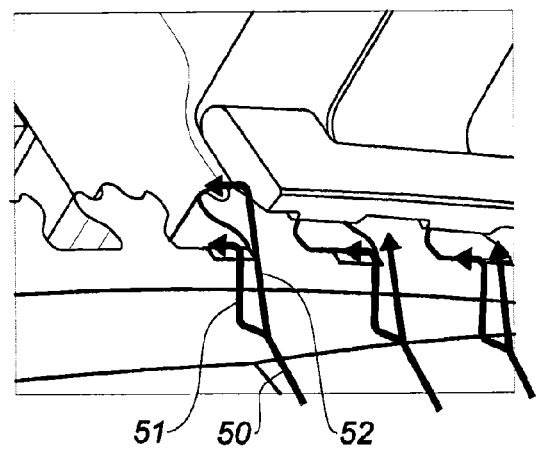
FIG. 8 is a perspective view of the turbine engine assembly in FIG. 7 without the movable ring.
Figure 9:
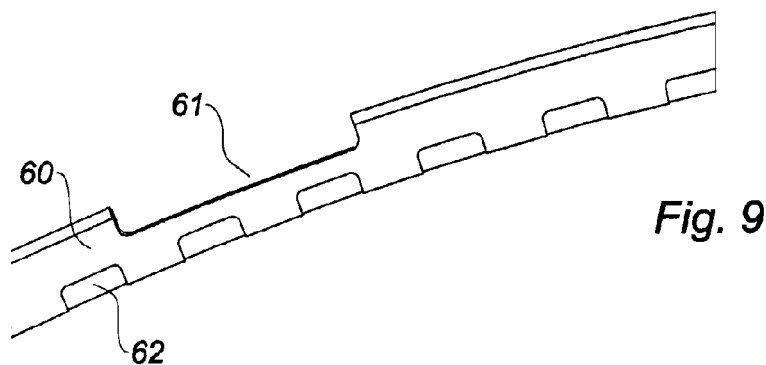
FIG. 9 is a perspective view of one portion of the sealing lock ring, according to a first embodiment thereof.
Figure 10:
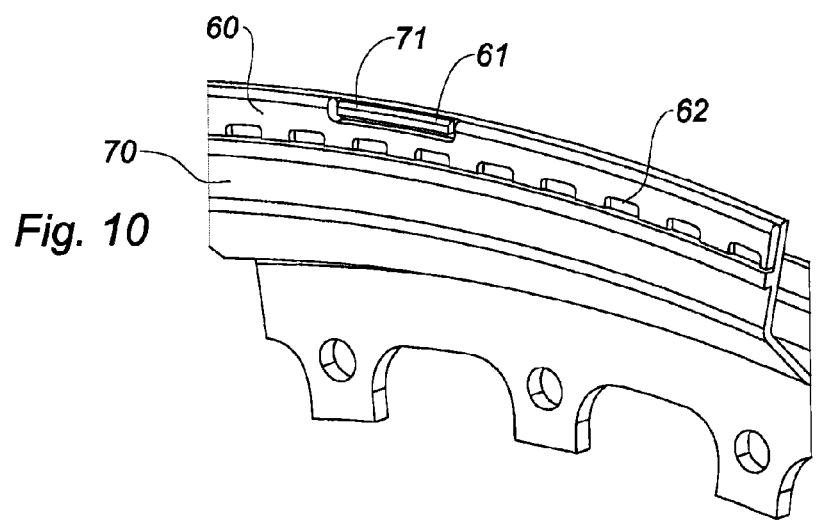
FIG. 10 is a perspective view of the lock ring of the portion of the sealing lock ring in FIG. 9, when it is cooperating with the movable ring.
Figure 11:
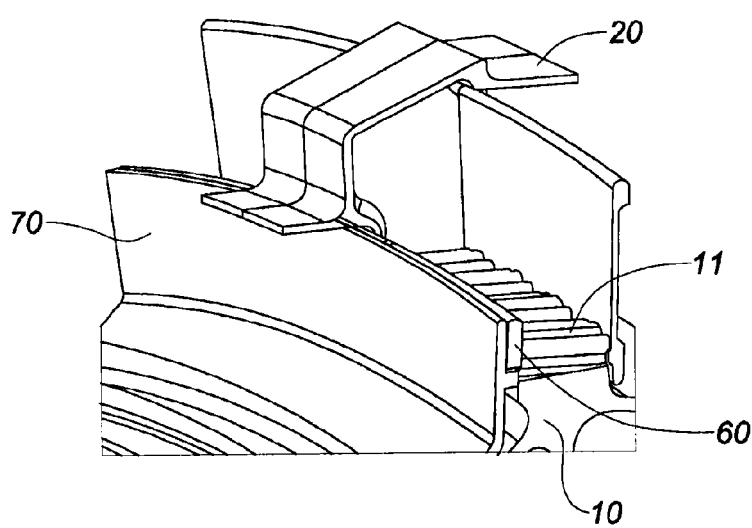
FIG. 11 is a perspective view of the turbine engine assembly fitted with the sealing lock ring and the movable ring in FIGS. 9 and 10.

Referring now to FIGS. 7 and 8, a sealing lock ring 60 is positioned against the disc 10 and the blade 20 so that it can join said disc and said blade on the upstream side in terms of the direction in which the main cooling air flow 51 passes. This sealing lock ring 60, shown in greater detail in FIG. 9, has a substantially crescent-shaped set of radial cavities 62, positioned facing the bulbs 11 of the disc 10 when the sealing lock ring 60 joins the disc 10 and the blade 20. The radial cavities 62 thus allow the secondary cooling air flows 52 and 53, coming from the air flow 50, to pass as far as the secondary channels 41 and 42.

In this way the cooling air flow 50 is divided into a main air flow 51, which passes through the main channel 40, and two secondary air flows 52 and 53, which pass through the secondary channels 41 and 42 respectively (FIG. 8).

It will be noted that the invention can be implemented with a different number of secondary channels, in so far as the bulb 11 has at least one of these. It is, however, preferable to have at least two secondary channels, so that the bulb 11 has at least two longitudinal cavities (such as the cavities 11.4 and 11.5) each separated by an apex (such as the apex 11.3), which makes it possible to preserve the anti-tilt function of the blade 20 over the apex of the bulb 11 and thus not to damage the foil 30.

The sealing lock ring 60 also has a set of radial grooves 61 through which the blades pass, at the time they are fitted, when the sealing lock ring 60 joins the disc 10 and the blade 20. These radial grooves 61 also allow the sealing lock ring 60 to be fixed to a movable ring 70, which has for the purpose a set of radial projections 71 with a complementary shape to the radial grooves 61 of the lock ring 60, and thus to prevent any rotation of said sealing lock ring.

The movable ring 70 is arranged, relative to the blades 20, so as to cause the axial stopping thereof downstream, with respect to the direction in which the main 51 and secondary 52, 53 cooling air flows pass.

Figure 12:
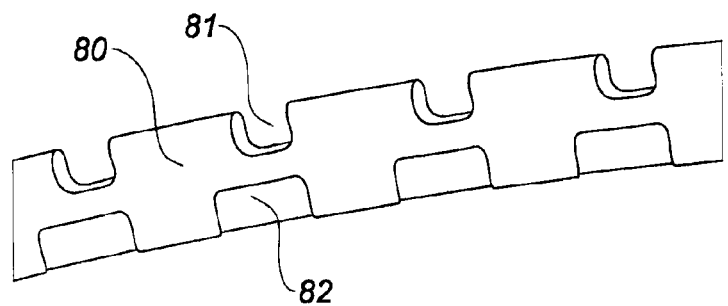
FIG. 12 is a perspective view of one portion of the sealing lock ring, according to a second embodiment thereof.
Figure 13:
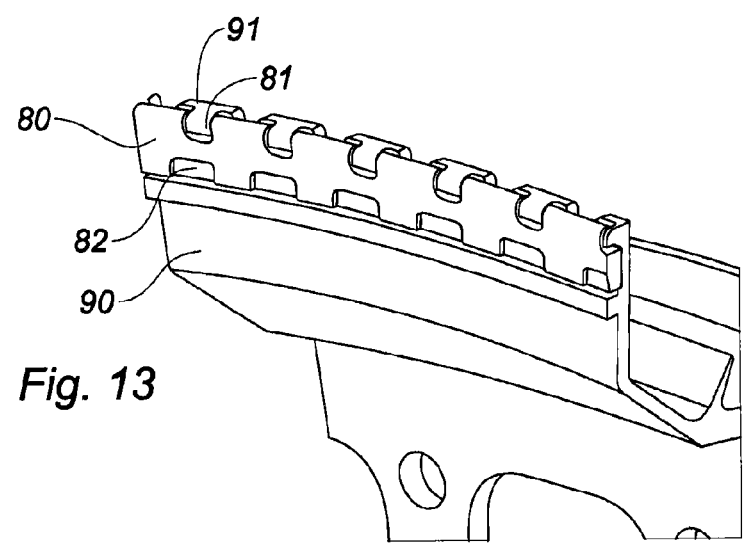
FIG. 13 is a perspective view of the lock ring of the portion of the sealing lock ring in FIG. 12, when it is cooperating with the movable ring.
Figure 14:
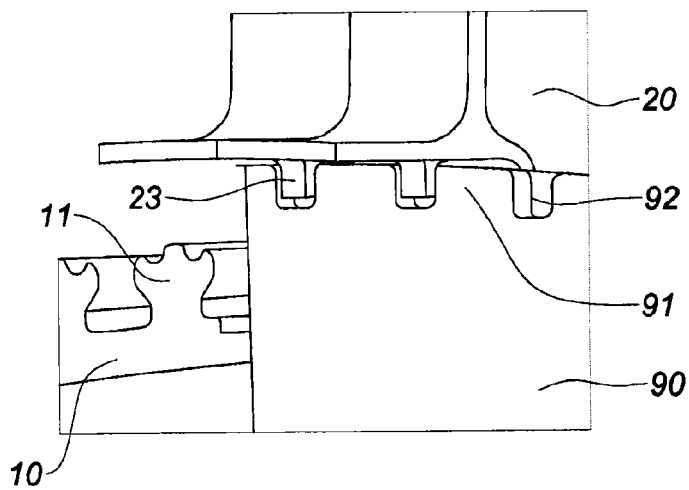
FIG. 14 is a perspective view of the turbine engine assembly fitted with the sealing lock ring and the movable ring in FIGS. 12 and 13.

In a variant of the invention, shown in FIGS. 12 to 14, the sealing lock ring 60 and the movable ring 70 are replaced by the lock ring 80 and the ring 90 respectively. The sealing lock ring 80 has a set of radial cavities 82 similar to the radial cavities 62, together with equally spaced radial grooves 81. As for the movable ring 90, this has a set of equally spaced radial projections 91 with a complementary shape to the radial grooves 81, so as to prevent the lock ring 80 from rotating with respect to the ring 90 (FIG. 13). In this embodiment, the number of radial projections 91 of the ring 90 is equal to the number of hooks 23 of the blade 20.

Moreover, the movable ring 90 is arranged, relative to the blades 20, so as to cause the axial stopping thereof upstream in terms of the direction in which the main 51 and secondary 52, 53 cooling air flows pass.

The invention claimed is:

1. A turbine engine assembly, comprising:
   a disc including a set of bulbs and recesses;
   a blade including a bulb and a set of recesses, the bulbs of the disc configured to cooperate with the recesses of the blade, one of the recesses of the disc configured to cooperate with the bulb of the blade, the bulb of the blade being arranged relative to the one of the recesses of the disc to form therebetween, when the bulb cooperates with the one of the recesses of the disc, a main channel through which a main cooling air flow can pass; and
   a foil configured to be positioned at least partly between the disc and the blade,
   wherein the foil is configured to cover mainly one of the bulbs of the disc and to be held, radially relative to the disc, by the bulb of the disc and the recess of the blade configured to cooperate therewith, when the bulb of the disc and the recess of the blade are actually cooperating,
   wherein the bulb of the disc includes at least one longitudinal cavity configured to form, together with the foil, when the foil is covering the bulb of the disc, a secondary channel through which a secondary cooling air flow can pass, and
   wherein the bulb of the disc is configured to be covered by a portion of the foil being circumferentially positioned between two recesses of the disc, the foil includes, on one side, a long end configured to cover at least partly one of the two recesses of the disc and, on an other side, a short end.

2. An assembly according to claim 1, wherein the long end of the foil is extended by portions which bear against walls of the disc for axially locking the foil with respect to the recess covered by the long end.

3. An assembly according to claim 1, wherein the bulb of the disc includes at least two longitudinal cavities separated by an apex of the bulb, the cavities configured, when the foil is covering the bulb, to form two secondary channels through which two secondary cooling air flows can pass.

4. An assembly according to claim 1, further comprising a sealing lock ring joining the disc and the blade upstream of the blade in a direction in which the main and secondary cooling air flows pass, the sealing lock ring including a set of radial cavities via which the secondary cooling air flow can be routed into the secondary channel.

5. An assembly according to claim 4, wherein the sealing lock ring further includes a set of radial grooves through which the blade can pass when the sealing lock ring joins the disc and the blade, the assembly further comprising:
   a movable ring including a set of radial projections configured to be housed in the radial grooves of the sealing lock ring to prevent any rotation of the sealing lock ring.

6. An assembly according to claim 5, wherein the movable ring is arranged to cause axial stopping of the blade upstream, in a direction in which the main and secondary cooling air flows pass.

7. An assembly according to claim 5, further comprising a plurality of blades, wherein the sealing lock ring includes radial grooves and the movable ring includes radial projections, a number of the radial grooves and the radial projections being the same as a number of hooks of blades configured to cooperate with the disc, and the movable ring is arranged to cause axial stopping of the blades upstream, in a direction in which the main and secondary cooling air flows pass.

* * * * *